US012667999B2

(12) United States Patent
Hull

(10) Patent No.: US 12,667,999 B2
(45) Date of Patent: Jun. 30, 2026

(54) CORDLESS AND RECHARGEABLE RESIN-CURING LAMP

(71) Applicant: Amanda Michelle Hull, Milford, OH (US)

(72) Inventor: Amanda Michelle Hull, Milford, OH (US)

( * ) Notice: Subject to any disclaimer, the term of this patent is extended or adjusted under 35 U.S.C. 154(b) by 309 days.

(21) Appl. No.: 18/590,137

(22) Filed: Feb. 28, 2024

(65) Prior Publication Data

US 2024/0286318 A1      Aug. 29, 2024

Related U.S. Application Data

(60) Provisional application No. 63/487,316, filed on Feb. 28, 2023.

(51) Int. Cl.
| | |
|---|---|
| *B29C 35/08* | (2006.01) |
| *B05D 3/06* | (2006.01) |
| *G02B 27/09* | (2006.01) |
| *H05B 45/10* | (2020.01) |
| *H05B 47/16* | (2020.01) |
| *H05B 47/175* | (2020.01) |

(52) U.S. Cl.
CPC .......... *B29C 35/0805* (2013.01); *B05D 3/067* (2013.01); *G02B 27/0983* (2013.01); *H05B 45/10* (2020.01); *H05B 47/16* (2020.01); *H05B 47/196* (2024.01); *B29C 2035/0827* (2013.01)

(58) Field of Classification Search
CPC ........ B29C 35/0805; B29C 2035/0827; B05D 3/067; G02B 27/0983; H05B 45/10; H05B 47/16; H05B 47/196

USPC ........................... 250/504 R, 453.11, 455.11
See application file for complete search history.

(56) References Cited

U.S. PATENT DOCUMENTS

| | | | |
|---|---|---|---|
| 4,008,401 | A | 2/1977 | Holoubek et al. |
| 4,591,724 | A | 5/1986 | Fuse et al. |
| 5,879,159 | A | 3/1999 | Cipola |
| 6,898,372 | B2 | 5/2005 | Boyle et al. |
| 8,193,514 | B2 | 6/2012 | Ferraro et al. |
| 8,337,200 | B2 | 12/2012 | Wang et al. |
| 8,362,451 | B2 | 1/2013 | Yoon et al. |
| 9,017,056 | B2 | 4/2015 | Schuepbach et al. |
| 9,051,208 | B2 | 6/2015 | Thomas et al. |
| 10,406,725 | B2 | 9/2019 | Takahashi et al. |
| 10,955,190 | B2 | 3/2021 | Hsieh et al. |
| 11,058,202 | B1 * | 7/2021 | Luu .................... F21V 33/0004 |

(Continued)

*Primary Examiner* — Jason L McCormack
(74) *Attorney, Agent, or Firm* — FBT Gibbons LLP; Alexander J. Johnson; Vance V. VanDrake, III

(57) ABSTRACT

A resin curing lamp includes an outer shell, an inner shell, a control module, an interactive display, at least one lighting panel, and a rechargeable battery. The outer shell has an interior surface, an exterior surface, and an aperture. The control module, the interactive display, and the lighting panels are mounted on the interior surface. The display is aligned with the aperture and electrically connects to the control module. The lighting panels have ultraviolet light-emitting diodes (LEDs) electrically connected to the control module. The inner shell has a battery compartment, a reflective inner surface, and oculi that conduct light LEDs. The battery is electrically connected to the control module. The control module regulates the power delivered to the LEDs as selected by the user, as well as the duration as selected by the user.

17 Claims, 3 Drawing Sheets

(56)　　　　　　References Cited

U.S. PATENT DOCUMENTS

| | | | |
|---|---|---|---|
| 11,565,486 | B2 | 1/2023 | Most et al. |
| 11,821,685 | B2 | 11/2023 | Haile et al. |
| 2002/0093833 | A1 | 7/2002 | West |
| 2011/0277338 | A1* | 11/2011 | Li ........................... F21V 29/61 |
| | | | 34/275 |
| 2014/0054472 | A1* | 2/2014 | Tanihara ............ B29C 35/0805 |
| | | | 250/492.1 |
| 2017/0133115 | A1* | 5/2017 | Wilson ................... B05D 3/061 |
| 2021/0022473 | A1* | 1/2021 | Hurter ..................... F26B 9/003 |
| 2021/0370120 | A1 | 12/2021 | Ewin |
| 2023/0123791 | A1 | 4/2023 | Spoo et al. |

* cited by examiner

CORDLESS AND RECHARGEABLE RESIN-CURING LAMP

CROSS-REFERENCE TO RELATED APPLICATION

This application claims the benefit of priority of U.S. provisional application No. 63/487,316, filed Feb. 28, 2023, the contents of which are herein incorporated by reference.

BACKGROUND OF THE INVENTION

The present invention relates to lamps and, more particularly, to cordless and rechargeable lamps operative to cure resins.

When creating ultraviolet (UV) resin art, a key part of the process is curing the UV resin art to harden and finish the art piece. UV resin is a liquid form of acrylic activated by a photo initiator, which will take the UV resin from a liquid state to a solid state when exposed to UV light. Thus, specialized equipment, namely UV and/or light emitting diode (LED) curing lamps, is used for curing the UV resin art. However, such curing lamps cannot be adjusted for the type of resin being used for UV resin art or for the particular needs of the UV resin art project. Conventional curing lamps have only one wattage and a small quantity of bulbs to activate the cure in the UV resin. They cannot be adjusted for the size of the UV resin art project. Further, no conventional curing lamps are configured for multiple formulas of UV resin.

Curing lamps also do not provide countdown timers specific to a UV resin formula to notify users when the UV resin has achieved a rock-hard cure with a smooth finish. Presently, users, principally resin artists, must guess on proper lamp wattage and cure time for each project. This unfortunately leads to the incorrect wattage and/or cure time being used, resulting in the resin artist's project becoming overcured, warped, or having a wrinkly finish, leading to the projects then being discarded. The wasted product and time created by these incorrect guesses is detrimental to both the resin artists and their customers. Further, conventional curing lamps require resin artists to work close to an electrical outlet for power, thereby limiting the locations where resin art may be worked on and cured. Thus, current curing lamps are un-reliable, un-adjustable and only allow users to cure small resin art pieces one at a time.

As can be seen, there is a need for a curing lamp that is adjustable to the needs of specific UV resin projects, that can provide timers as well as adjustable wattage controls to ensure UV resin is properly cured, and that allows UV resin projects to be created and cured in a wider variety of settings.

SUMMARY OF THE INVENTION

The present invention solves these issues by providing a portable LED lamp with timers, adjustable wattage controls, a rechargeable cordless battery source, and a mirrored internal surface. The lamp can be tailored to the needs of a particular UV resin art project. The resin artist may adjust lamp height, lamp wattage, and curing time to the needs of one or more UV resin art projects simultaneously. Further, the lamp provides safer and slower curing of the UV resin to produce a rock-hard, glass-like, smooth finish for the UV resin art project, all while providing more freedom to perform the UV resin curing in more locations because there is no need to connect to an external power source.

In one aspect of the present invention, a resin curing lamp comprises an outer shell having an interior surface, an exterior surface, and a first aperture formed therethrough; a control module, mounted on the interior surface; an interactive display mounted on the interior surface and aligned with the first aperture, the interactive display being electrically connected to the control module; at least one lighting panel, with light-emitting diodes (LEDs) operative to emit ultraviolet (UV) radiation, mounted on the interior surface, the LEDs being electrically connected to the control module; an inner shell having a battery compartment formed therein, the inner shell having a reflective inner surface, with oculi formed through the inner shell, the oculi operative to conduct radiation from the light-emitting diodes; and a rechargeable battery housed within the battery compartment and electrically connected to the control module. The control module is operative to regulate an amount of power delivered to the LEDs to a wattage selected by a user and the control module is operative to regulate a duration of power delivery to the LEDs to a time selected by the user.

In some aspects, the lamp comprises a tray with a light reflective surface magnetically coupled to the inner shell.

In some aspects, a viewing aperture is formed through the inner shell and the outer shell.

In some aspects, the inner shell and the outer shell extend to form a handle around the viewing aperture.

In some aspects, the lamp comprises a switch operative to control an on-off state of the control module.

In some aspects, the inner shell further comprises a U-shaped base having extendable feet mounted therein, operative to raise the resin curing lamp above a surface.

In some aspects, the inner shell has a first surface operative to support the resin curing lamp in a horizontal position and a second surface operative to support the resin curing lamp in a vertical position.

In some aspects, the at least one lighting panel comprises a first lighting panel on a first sidewall, a second lighting panel on an opposite sidewall, and a third lighting panel positioned on an adjoining wall therebetween.

In some aspects, at least one of the inner shell and the outer shell is monolithically formed from acrylonitrile butadiene styrene and/or polycarbonate.

These and other features, aspects and advantages of the present invention will become better understood with reference to the following drawings, description, and claims.

DETAILED DESCRIPTION OF THE INVENTION

Figure 1:
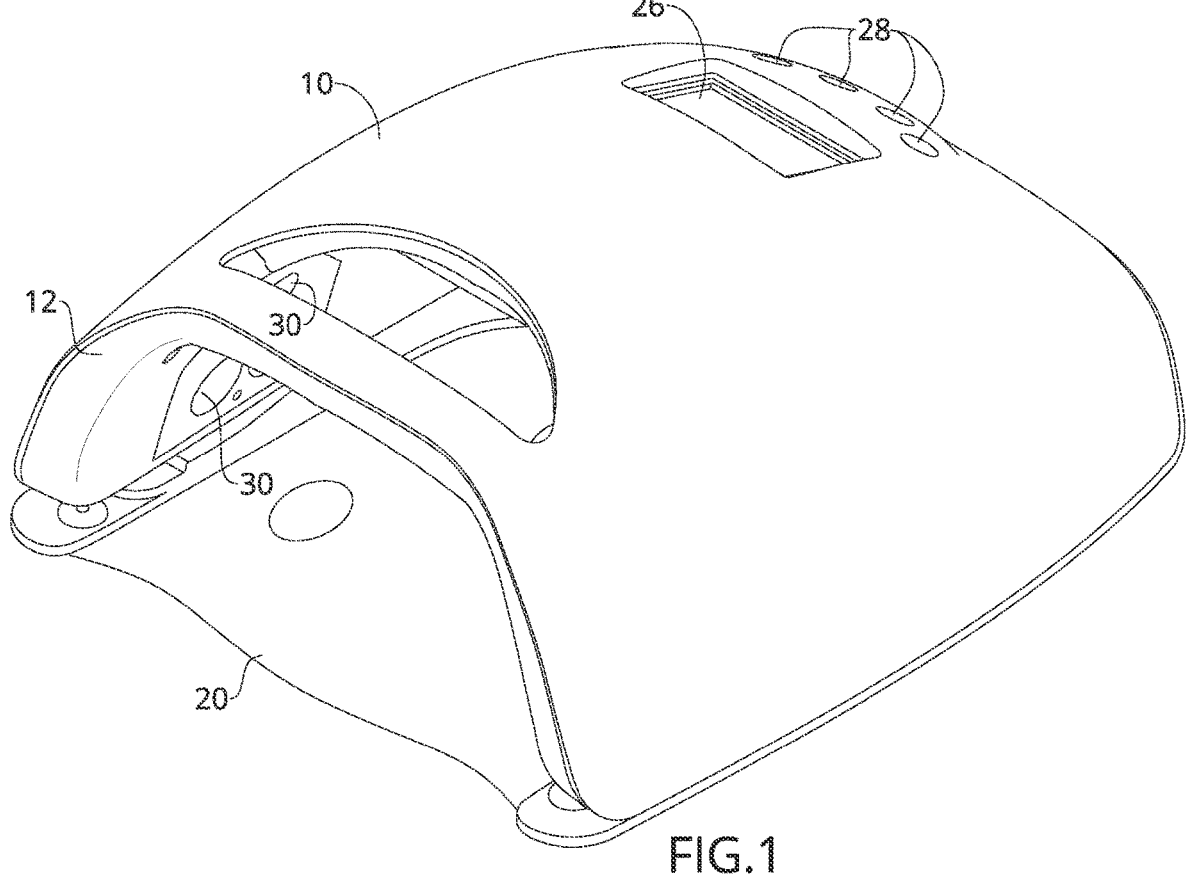
FIG. 1 is a perspective view of an ultraviolet light resin curing device according to an embodiment of the present invention.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a UV LED lamp having a housing with a plurality of LED elements operative to emit UV radiation (wavelengths between about 100 nm and about 400 nm).

The housing may comprise an upper shell and an interior upper housing, joined together by known fastening means, such as screws. The upper shell extends above and around the interior upper housing, such that it at least partially envelops the interior upper housing. The interior upper housing is curved to form a curing space that accommodates UV resin projects and may have a U-shaped base formed thereon, with magnets embedded therein. The interior upper housing may have a mouth or collar formed around the curing space. The mouth forms a level surface for resting the lamp in a vertical position. The base may have feet for use resting the lamp on a surface in a horizontal position. The feet may be stationary feet or extendable feet. The extendable feet, for example made of curved wire, may be folded flat into the U-shaped surface when not in use and folded out to support the device when in use.

The UV LED lamp may have a handle, enabling the user to easily carry the lamp. A viewing opening may be formed in the upper shell and interior upper housing at a front end or mouth of the UV LED lamp. The viewing opening may serve as at least part of the handle.

LED light panels may be mounted in multiple locations within the interior upper housing, such as on each side thereof, extending substantially vertically near a junction of the interior upper housing and the base, wherein the side LED lights are positioned to be above or beside a UV resin art project placed within the curing space. Additionally, LED lights mounted in the interior upper surface of the housing may be configured to shine light upon a UV resin art project placed within the curing space.

UV-producing LED bulbs may each be encircled by a reflective cup within the interior upper housing. The reflective cups are configured to direct the UV light produced by the LED bulbs towards the one or more UV resin art projects within the curing space. The inward facing surface of the inner upper housing may also have an overall reflective surface.

A mirrored tray may be magnetically secured to the base, converting the curing space to a curing chamber, such that the UV light produced by the LED bulbs may be reflected off the mirrored tray and back towards the UV resin art project, thereby allowing the UV resin art project to be cured from all angles, including the bottom. In other words, the mirrored tray reflects light emitted by the top and side LED lights such that UV resin art is hit with the emitted light from the top, bottom, and both the left and right sides. In some embodiments, the mirrored tray has a polished metal surface.

The internal surface of the curing space may have a reflective coating. Various LED bulbs may be provided to produce a variety of wattages and temperatures.

In some embodiments, the lamp may be supported by extendable feet, such as adjustable metal feet, telescopic supports, and/or adjustable platforms. For example, the inner shell base may have adjustable feet attached to exterior facing portions thereof, allowing the lamp to be raised or lowered to allow differing sizes and numbers of UV resin art projects to be placed within the curing space and to vary the distance between the UV resin art projects and the top and side LED lights. For example, the adjustable feet may allow for the curing space height to be adjusted by 0.5 inches, 0.75 inches, or 1 inch to adjust the volume of the curing space. For example, a user may expand the curing space by removing the magnetic tray and releasing the adjustable feet into an extended position.

The interior housing may have a compartment formed therein, configured to house a battery, such as a rechargeable battery, with electrical connections to external electrical ports for recharging the battery and to a switch to power the UV LED lamp on or off. In some embodiments, the power setting (on/off) may be operated with touch-sensitive controls. A power adapter, such as those used for portable computers, can be utilized to allow the battery to be recharged through an electrical outlet. While the preferred embodiment of the UV LED lamp includes a battery, the UV LED lamp may optionally be powered through an electrical cable connected to an electrical outlet and power adapter. In some embodiments, when charging, the UV LED lamp may include a charging indicator on the power adapter. For example, the charging indicator may be an LED light that glows red to indicate the battery is still charging and glows green to indicate that the battery is fully charged. In some embodiments, the rechargeable battery may use various power sources, including alternative energy sources like solar panels.

The interior upper housing and upper shell may hold an interactive display, for example an LCD display, electrically communicating with the battery and the LED elements. The interactive display may include at least a battery level indicator, a wattage gauge, and curing countdown timers. The wattage gauge may display the available wattage modes the user can choose from, for example and without limiting the invention, 6, 12, 15, 18, 24, 36, or 48 watts, enabling the user to select a wattage based upon the resin and type of product to be cured. In some embodiments, the display may include 3 countdown timers. The curing timer may display the available curing times the user can choose from, including, but not limited to, 60, 90, or 120 seconds, enabling the user to select a curing time based upon the resin to be cured, the type of product to be cured, and the selected wattage. Using the display, the user may set the desired wattage and curing time. The user may change the settings via buttons provided on the upper shell adjacent to the interactive display, or by manipulating the interactive display itself. The interactive display and associated buttons are positioned to be visible during use and to be manipulated through an exterior face of the upper shell. The battery indicator displays the remaining battery level so that the user knows when they must recharge the UV LED lamp.

In some embodiments, selecting the curing time may immediately activate the LEDs without any additional user action.

In some embodiments, a controller, such as a processor, may be used to perform logic functions. The processor may be mounted on a printed circuit board (PCB) and may electrically communicate with the battery, the LED elements, and the interactive display. In some embodiments, the PCB may have a variety of input sources, including touch-sensitive controls, voice command systems, and/or smartphone app interfaces. The logic functions may begin with user input through the interactive LCD display and buttons. If the user adjusts the wattage, then the controller calculates and communicates the necessary power output to the LED lights. If the user sets the curing time, then the controller starts a countdown timer. When the preset curing time is complete, the controller may automatically shut down the LEDs to avoid overcuring or damaging resin projects. The controller may continually monitor the battery level and update the display. If the battery level is low, this information is easily visible to the user. Moreover, the lamp may store and access user profiles and curing presets based on frequent use cases. The lamp may also have wireless access for remote control capabilities. The control may be integrated with a smartphone app for real-time monitoring and control.

In some embodiments, the lamp may comprise a UV sensor to enhance accuracy and reliability in curing processes.

In operation, a user first charges the battery of the UV LED lamp. Once charged, the user may place the UV LED lamp in a horizontal or vertical orientation depending on the needs of the UV resin project being worked upon. The user may then adjust the position of the lamp using the adjustable feet in the base to suit the needs of the resin art project. Once the desired position is set, the desired resin art project(s) may be placed into the curing space, the user may power on the UV LED lamp, and select a desired wattage and curing time. The user selects a desired wattage by pressing one or more of the associated buttons until the desired wattage is reached. The user may then select a desired curing time by pressing one or more of the associated buttons until the desired curing time is reached. To prevent overcuring or damage, the timer initiates the automatic shutdown of the LED lights when the preset curing time expires. The top and side LED lights then shine light upon the UV resin art project, whereupon photo initiators within the UV resin of the UV resin art project interact with the light and cure the UV resin. While curing, the UV resin art project may be removed from within the curing space to adjust the UV resin art project as needed. Once the curing time expires, the top and side LED lights power down to prevent warping and over-curing of the UV resin art project. The result is a properly cured UV resin art project with a rock-hard and glass-like finish.

The method of manufacture of the UV LED lamp is not particularly limited. For example, the base, interior upper housing, upper shell, and reflective tray may be formed by molding, casting, machining, or other known means.

Further, the materials comprising the components of the UV LED lamp are not particularly limited. For example, the base, interior upper housing, upper shell, and reflective tray may be formed from light, strong materials including hard plastics, such as acrylonitrile butadiene styrene (ABS) or polycarbonate (PC), and/or metals, such as stainless steel.

Additionally, it should be noted that the size and dimensions of the UV LED lamp are not particularly limited. Further, the positioning of exterior facing components, such as the adjustable feet or interactive display, may be altered without affecting the functionality of the UV LED lamp.

While the lamp disclosed herein is discussed in relation to curing UV resin-based art projects, it should be noted that the UV LED lamp may be used in a variety of other applications where resin needs to be cured. Examples may include curing dental resin during restorative procedures; curing UV-sensitive photopolymer resins for additive manufacturing processes; curing encapsulants and coatings in electronics manufacturing; and curing materials in some medical devices and equipment. Moreover, although the present invention is intended for curing UV resin, a liquid form of acrylic, other products such as artificial nails or gel polish for artificial nails, as well as many types of pigments and paints, may benefit from use of the present subject matter for curing. In some embodiments, the lamp disclosed herein may be used to cure materials for laboratory experiments and studies. However, the effectiveness may depend on the resin used in such products.

Figure 2:
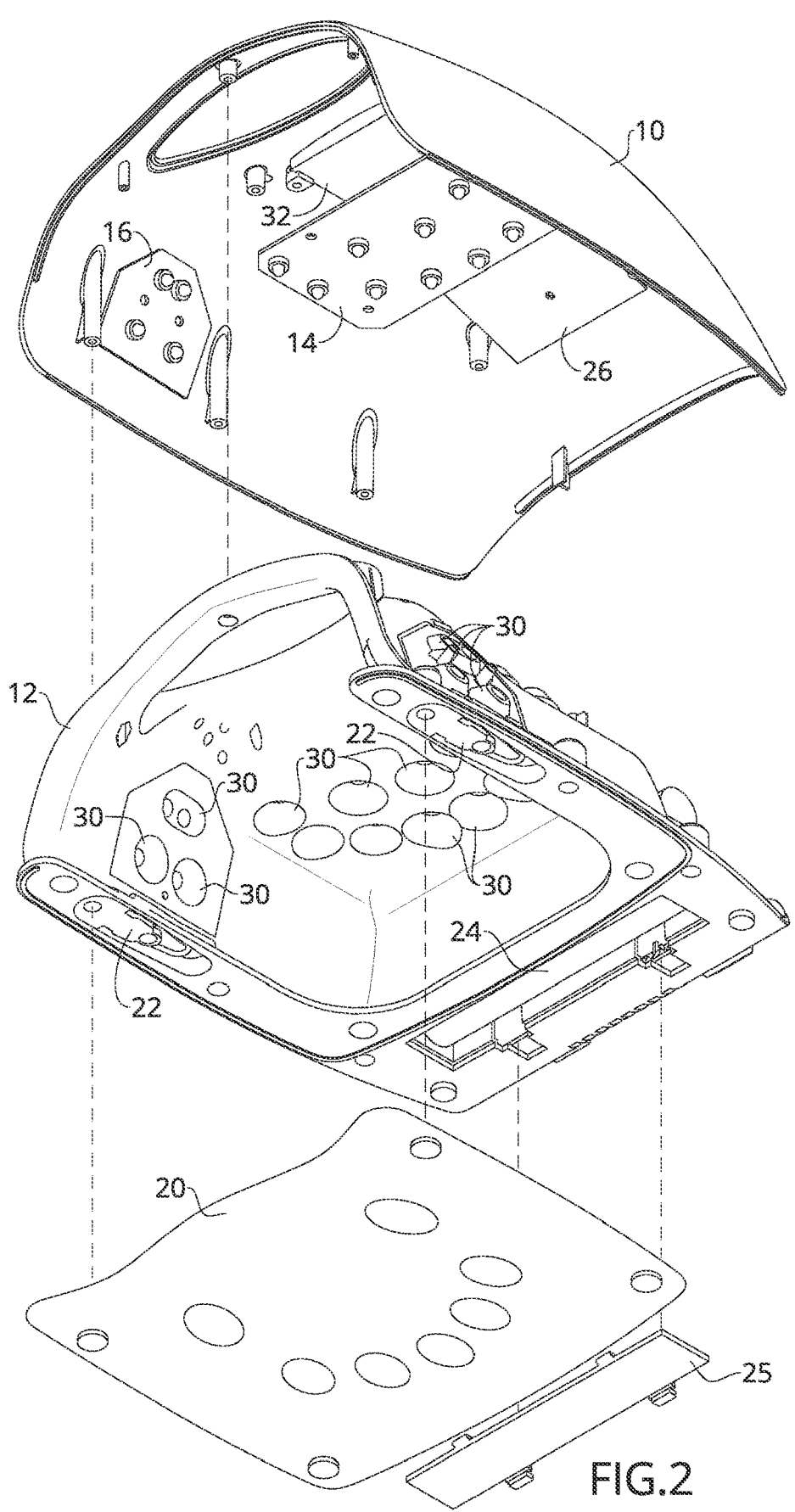
FIG. 2 is an exploded view thereof.
Figure 3:
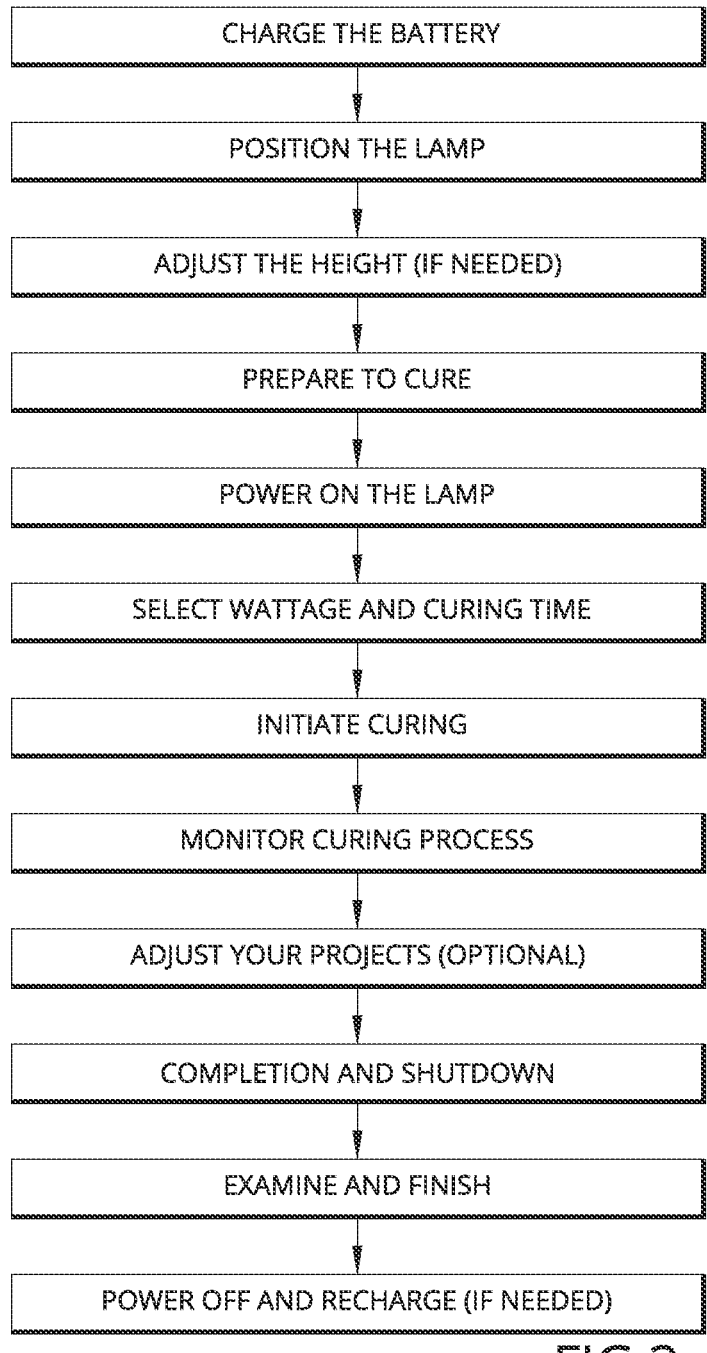
FIG. 3 is a flow chart illustrating a method of curing resins therewith.

Referring to FIGS. 1 through 3, FIGS. 1 and 2 illustrate a lamp assembly according to an embodiment of the present invention comprising a curved inner shell 12 mated to an upper shell 10 and a removable reflective tray 20 to form a curing chamber. An aperture formed in the inner shell 12 and the upper shell 10 may be used as a handle. The upper shell 10 houses an interactive LCD display 26 with operating buttons 28. As better seen in FIG. 2, the upper shell 10 has a printed circuit board (PCB) 32 or controller and UV light panels 14, 16, 18 mounted to top and side inner surfaces. For example, a first light panel may have a row of 7 LEDs and an adjacent row of 5 LEDs, and another two light panels may have a single LED or a pair of abutting LEDs adjacent to a spaced pair of LEDs. Apertures formed in the inner shell 12 align with each of the LEDs of the light panels 14, 16, 18 and are surrounded with reflective cups 30. The inner shell 12 also has a battery compartment formed therein to house a rechargeable battery 24. The LCD display 26, the light panels 14, 16, 18, and the battery 24 in the battery compartment electronically communicate with the PCB 32. Adjustable feet 22 housed within the inner shell 12 may be extended to raise the light panels 14, 16, 18 and make more room in the curing compartment for larger projects. The tray 20 magnetically couples to the inner shell 12. A battery cover 25 latches onto the battery compartment to retain the battery 24.

FIG. 3 illustrates a method of using the lamp. The user may charge the battery, position the lamp, and adjust its height to accommodate the resin coated article to be cured. The user may select a wattage and curing time. The user may initiate the lamp power to begin the curing process. The resin-coated article may be monitored during the curing process and may be adjusted as needed. Once the timer has expired, the user may shut down the lamp, examine the resulting product, and finish the piece. The lamp may be powered off and recharged if necessary.

It should be understood, of course, that the foregoing relates to exemplary embodiments of the invention and that modifications may be made without departing from the spirit and scope of the invention as set forth in the following claims.

What is claimed is:
1. A resin curing lamp, comprising:
   a) a shell comprising an outer shell and an inner shell, the shell defining an internal curing cavity;
   b) a control module, the control module being associated with the shell and positioned at least partially within the internal curing cavity defined by the shell, wherein the control module is configured for attachment to a battery;
   c) an interactive display, the interactive display being associated with the shell, wherein the interactive display is in communication with control module; and
   d) at least one lighting panel, the at least one lighting panel including at least one light-emitting diode (LED) operative to emit ultraviolet (UV) radiation, wherein the at least one lighting panel is in communication with the control module;
wherein the control module is operative to regulate an amount of power delivered to the at least one LED to a wattage selected by a user from a range of wattages;
wherein the inner shell is mateable with the outer shell, a viewing aperture is formed through the inner shell and the outer shell, and the inner shell and the outer shell extend to form a handle around the viewing aperture; and
wherein the control module is operative to regulate a curing time duration for the amount of power delivered to the LEDs, the curing time duration being selected by the user from a range of curing time durations.

2. The resin curing lamp of claim 1, further comprising a switch operative to control an on-off state of the control module.

3. The resin curing lamp of claim 1, wherein the inner shell further comprises a base having extendable feet mounted therein, operative to raise the resin curing lamp above a surface.

4. The resin curing lamp of claim 1, wherein the inner shell has a first surface operative to support the resin curing lamp in a horizontal position and a second surface operative to support the resin curing lamp in a vertical position.

5. The resin curing lamp of claim 1, wherein the at least one lighting panel comprises a first lighting panel on a first sidewall, a second lighting panel on an opposite sidewall, and a third lighting panel positioned on an adjoining wall therebetween.

6. The resin curing lamp of claim 1, wherein at least one of the inner shell and the outer shell is monolithically formed from acrylonitrile butadiene styrene and/or polycarbonate.

7. The resin curing lamp of claim 1, further comprising a tray with a light reflective surface magnetically coupled to the inner shell.

8. The resin curing lamp of claim 1, wherein the range of wattages includes from 6 watts to 48 watts.

9. The resin curing lamp of claim 1, wherein the range of curing times includes from 60 second to 120 seconds.

10. A resin curing lamp, comprising:
a) a shell comprising an outer shell and an inner shell, the shell defining an internal curing cavity;
b) a control module, the control module being associated with the shell and positioned at least partially within the internal curing cavity defined by the shell, wherein the control module is configured for attachment to a battery;
c) an interactive display, the interactive display being associated with the shell, wherein the interactive display is in communication with control module;
d) at least one lighting panel, the at least one lighting panel including at least one light-emitting diode (LED)

operative to emit ultraviolet (UV) radiation, wherein the at least one lighting panel is in communication with the control module; and
e) a tray with a light reflective surface magnetically coupled to the inner shell;
wherein the control module is operative to regulate an amount of power delivered to the at least one LED to a wattage selected by a user from a range of wattages; and wherein the control module is operative to regulate a curing time duration for the amount of power delivered to the LEDs, the curing time duration being selected by the user from a range of curing time durations.

11. The resin curing lamp of claim 10, wherein the inner shell is mateable with the outer shell, wherein a viewing aperture is formed through the inner shell and the outer shell, and wherein the inner shell and the outer shell extend to form a handle around the viewing aperture.

12. The resin curing lamp of claim 10, further comprising a switch operative to control an on-off state of the control module.

13. The resin curing lamp of claim 10, wherein the inner shell further comprises a base having extendable feet mounted therein, operative to raise the resin curing lamp above a surface.

14. The resin curing lamp of claim 10, wherein the inner shell has a first surface operative to support the resin curing lamp in a horizontal position and a second surface operative to support the resin curing lamp in a vertical position.

15. The resin curing lamp of claim 10, wherein the at least one lighting panel comprises a first lighting panel on a first sidewall, a second lighting panel on an opposite sidewall, and a third lighting panel positioned on an adjoining wall therebetween.

16. The resin curing lamp of claim 10, wherein at least one of the inner shell and the outer shell is monolithically formed from acrylonitrile butadiene styrene and/or polycarbonate.

17. The resin curing lamp of claim 10, wherein the range of wattages includes from 6 watts to 48 watts and wherein the range of curing times includes from 60 second to 120 seconds.

* * * * *